US012649236B2

(12) United States Patent
Song et al.

(10) Patent No.: US 12,649,236 B2
(45) Date of Patent: Jun. 9, 2026

(54) APPARATUS FOR MOUNTING COMPONENT AND METHOD FOR MOUNTING COMPONENT

(71) Applicant: SEMES CO., LTD., Cheonan-si (KR)

(72) Inventors: Ji Keun Song, Cheonan-si (KR); Yoon Whoi Kim, Cheonan-si (KR)

(73) Assignee: Semes Co., Ltd., Chungcheongnam-do (KR)

( * ) Notice: Subject to any disclaimer, the term of this patent is extended or adjusted under 35 U.S.C. 154(b) by 587 days.

(21) Appl. No.: 18/323,709

(22) Filed: May 25, 2023

(65) Prior Publication Data

US 2023/0382660 A1     Nov. 30, 2023

(30) Foreign Application Priority Data

May 26, 2022     (KR) ........................ 10-2022-0064585

(51) Int. Cl.
B25J 9/16          (2006.01)
B25J 13/08         (2006.01)
(Continued)

(52) U.S. Cl.
CPC ........... B25J 9/1664 (2013.01); B25J 9/1669 (2013.01); B25J 9/1687 (2013.01); B25J 9/1697 (2013.01);
(Continued)

(58) Field of Classification Search
CPC ...... B25J 9/1664; B25J 9/1669; B25J 9/1687; B25J 9/1697; B25J 13/08; B25J 15/0038;
(Continued)

(56) References Cited

U.S. PATENT DOCUMENTS

| | | | | |
|---|---|---|---|---|
| 10,953,540 | B2 * | 3/2021 | Wang | B25J 9/1692 |
| 2021/0354293 | A1 * | 11/2021 | Nakaya | G05B 19/18 |

(Continued)

FOREIGN PATENT DOCUMENTS

| | | |
|---|---|---|
| KR | 10-2019-0000430 A | 1/2019 |
| KR | 10-2021-0014059 A | 2/2021 |

(Continued)

OTHER PUBLICATIONS

Korean Office Action dated May 8, 2024 issued in corresponding Korean Appln. No. 10-2022-0064585.

*Primary Examiner* — Thomas Randazzo
(74) *Attorney, Agent, or Firm* — Harness, Dickey & Pierce, P.L.C.

(57) ABSTRACT

An apparatus for mounting a component includes an articulated robot mounting a component on a replacement target where the component is provided at a mounting position, a first sensor unit provided in the articulated robot and sensing the mounting position or whether or not the component is provided, a second sensor unit provided in the articulated robot and sensing spaced distances between the articulated robot and the mounting position at a plurality of points, and a control unit controlling the articulated robot to mount the component on the replacement target and controlling a position of the articulated robot so that a difference between spaced distance values between the articulated robot and the plurality of points sensed by the second sensor unit converges to zero, when the component is not sensed or a surface of the mounting position is sensed by the first sensor unit.

20 Claims, 11 Drawing Sheets

(51) Int. Cl.
  *B25J 15/00*   (2006.01)
  *B25J 19/02*   (2006.01)
  *B65G 47/90*   (2006.01)
  *F17C 13/06*   (2006.01)

(52) U.S. Cl.
  CPC ........... *B25J 13/08* (2013.01); *B25J 15/0038*
    (2013.01); *B25J 19/02* (2013.01); *B65G*
    *47/905* (2013.01); *F17C 13/06* (2013.01)

(58) Field of Classification Search
  CPC ....... B25J 19/02; B25J 9/06; B25J 5/02; B25J
    13/088; B65G 47/905; F17C 13/06; F17C
    2270/0518; G05B 2219/37425; G05B
    2219/40059; G05B 2219/40584; H10P
    72/0402
  See application file for complete search history.

(56)      References Cited

U.S. PATENT DOCUMENTS

| | | | | |
|---|---|---|---|---|
| 2021/0354299 A1 * | 11/2021 | Xiong | .................... | G01B 21/04 |
| 2023/0129083 A1 * | 4/2023 | So | ............................. | G01L 5/00 |
| | | | | 414/273 |
| 2025/0144823 A1 * | 5/2025 | Byeon | .................... | B25J 19/023 |

FOREIGN PATENT DOCUMENTS

| | | | | |
|---|---|---|---|---|
| KR | 10-2022-0020745 A | 2/2022 | | |
| KR | 10-2023-0058970 A | 5/2023 | | |
| KR | 102551792 B1 * | 7/2023 | ............. | B67B 7/182 |
| KR | 20230149373 A * | 10/2023 | ............. | F17C 13/045 |

* cited by examiner

[FIG. 1]
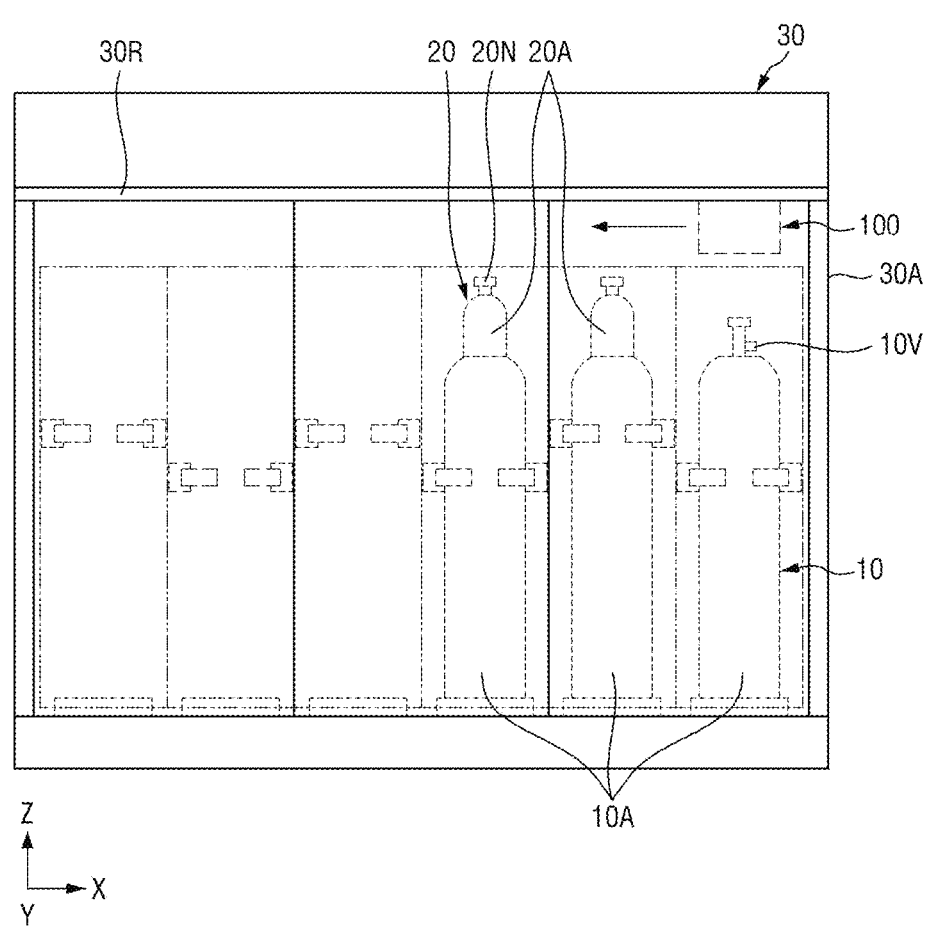

[FIG. 2]
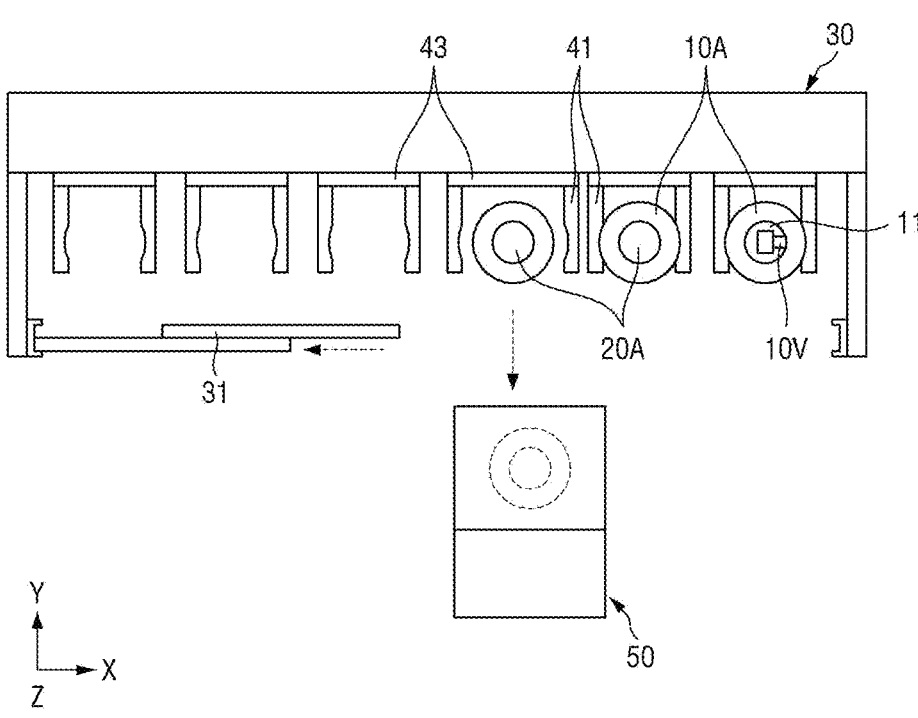

[FIG. 3]
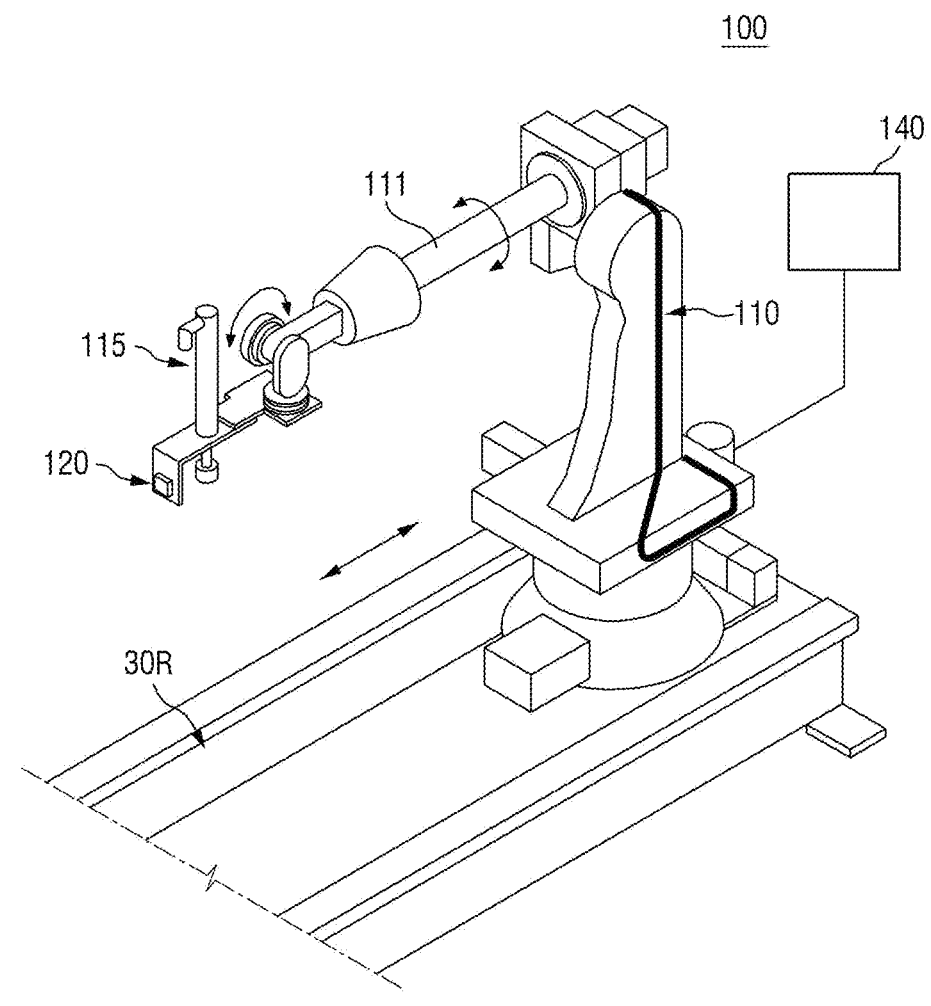

[FIG. 4]
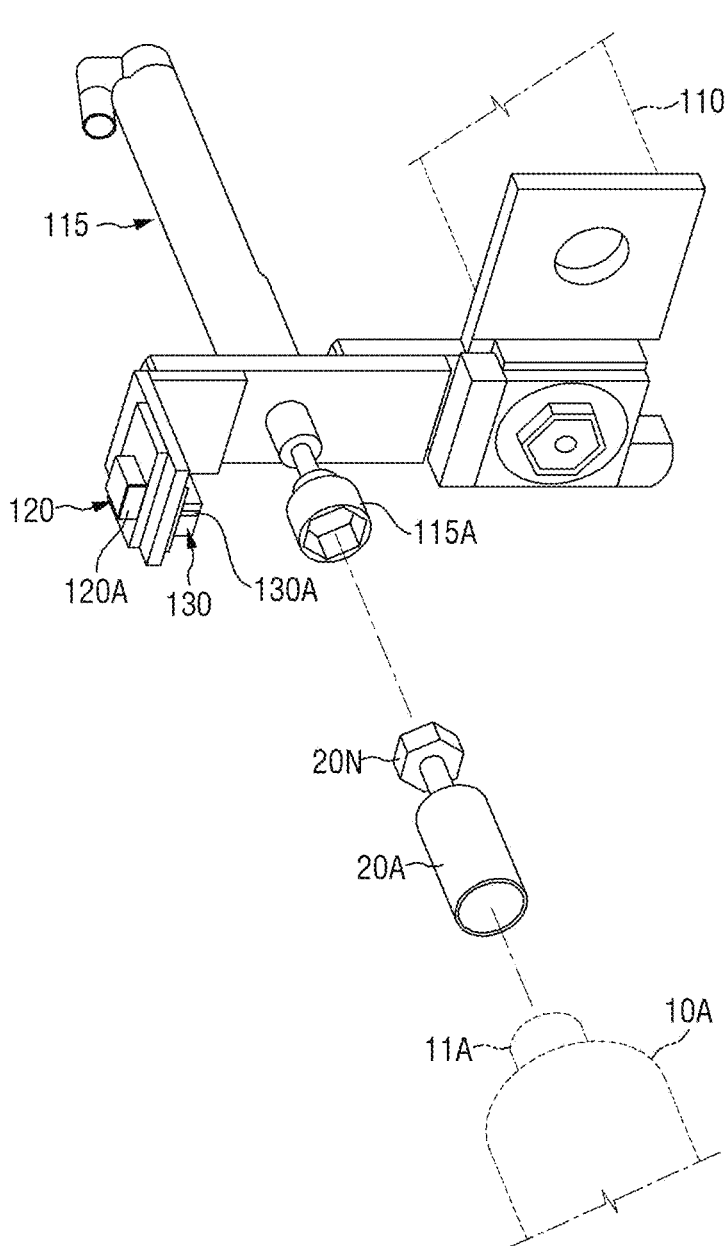

[FIG. 5]
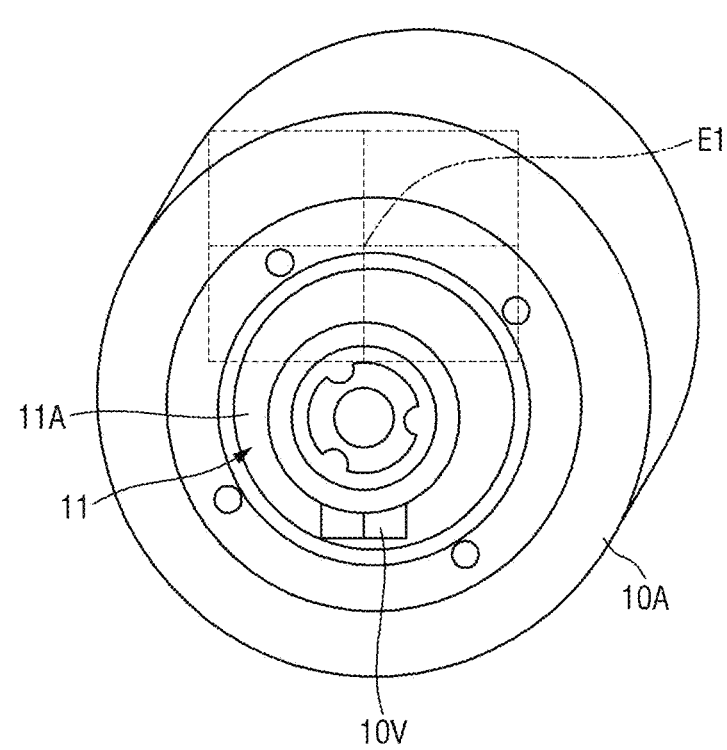

[FIG. 6]
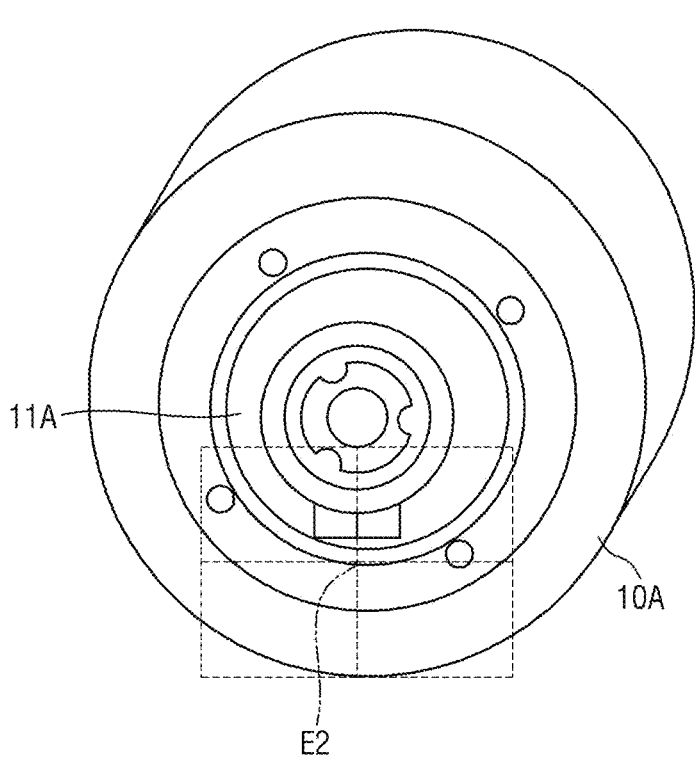

[FIG. 7]
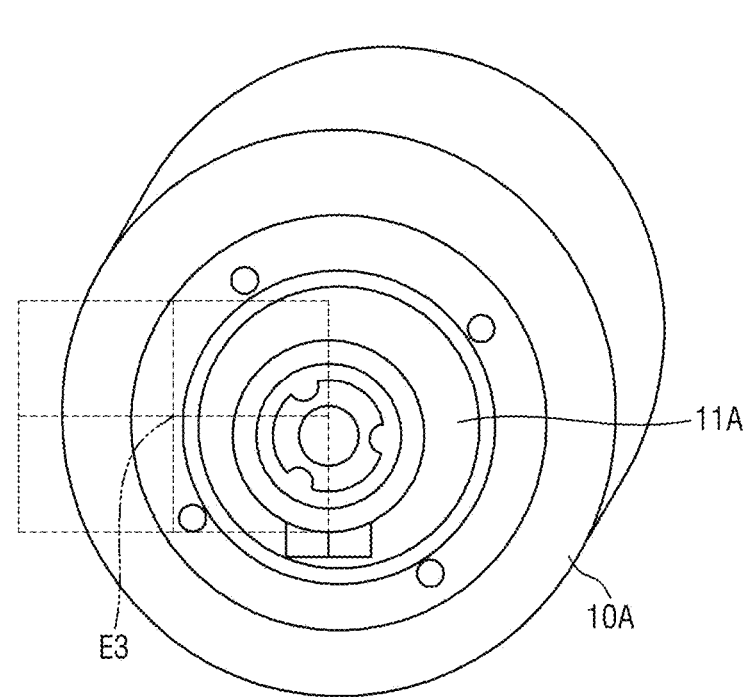

[FIG. 8]
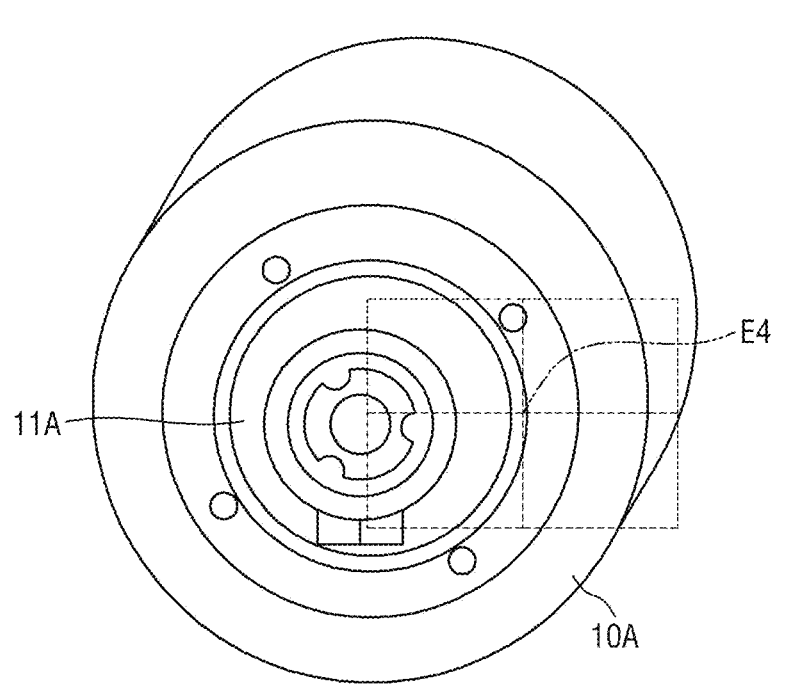

[FIG. 9]
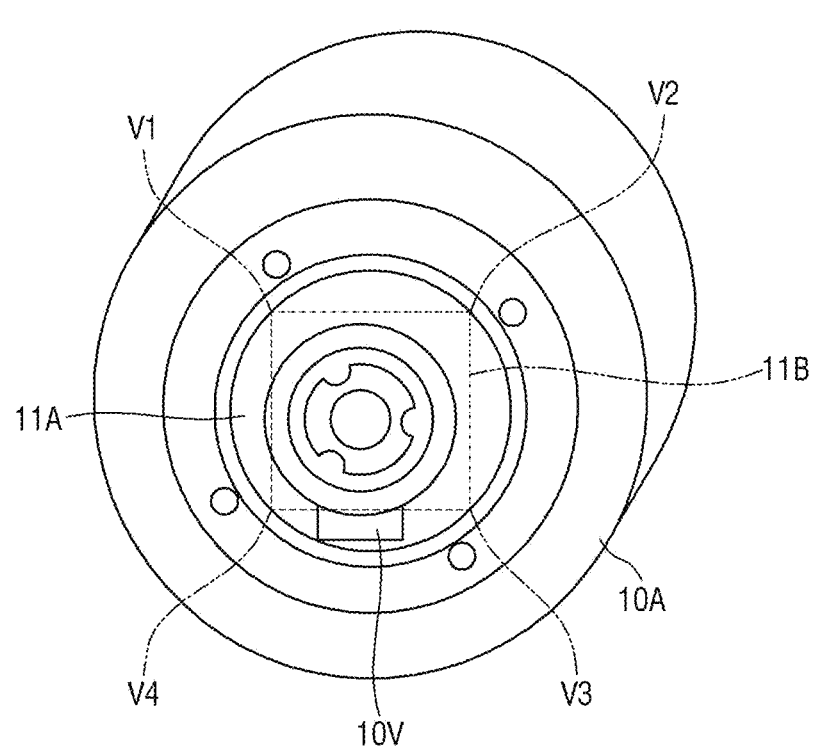

[FIG. 10]
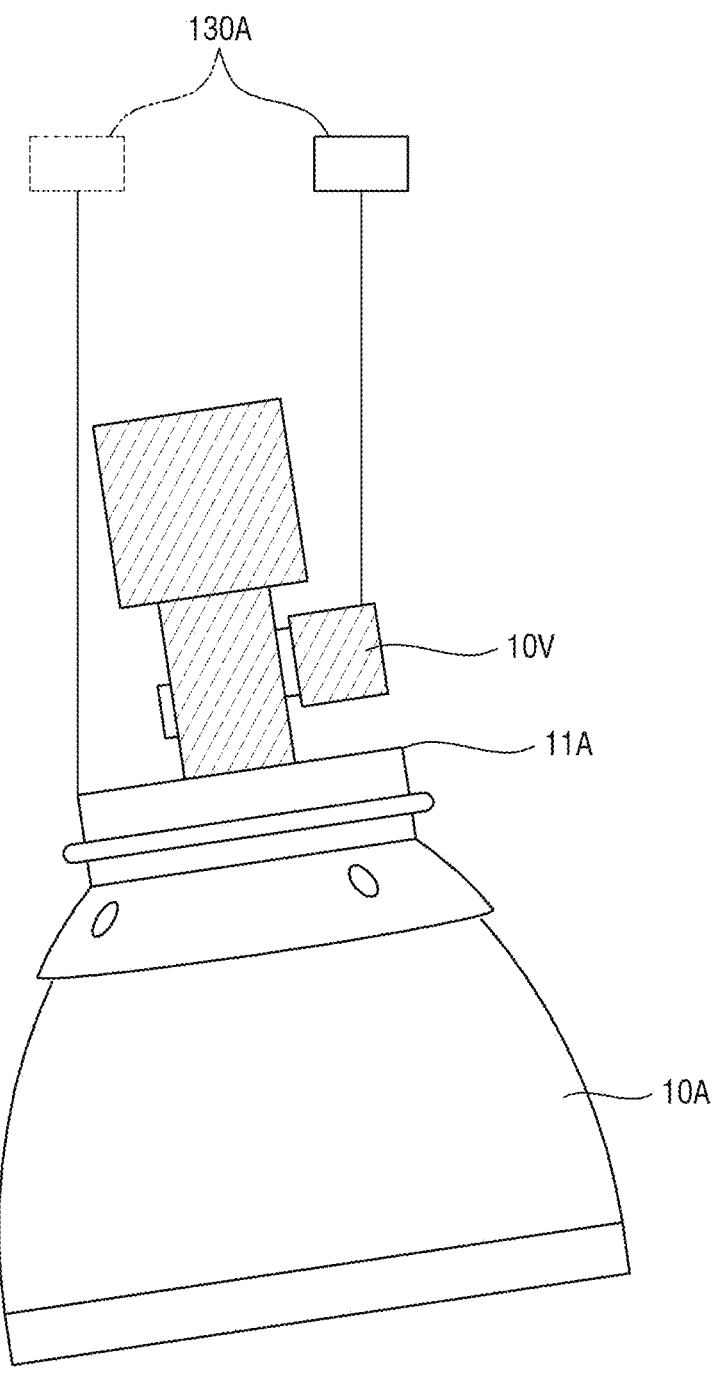

[FIG. 11]
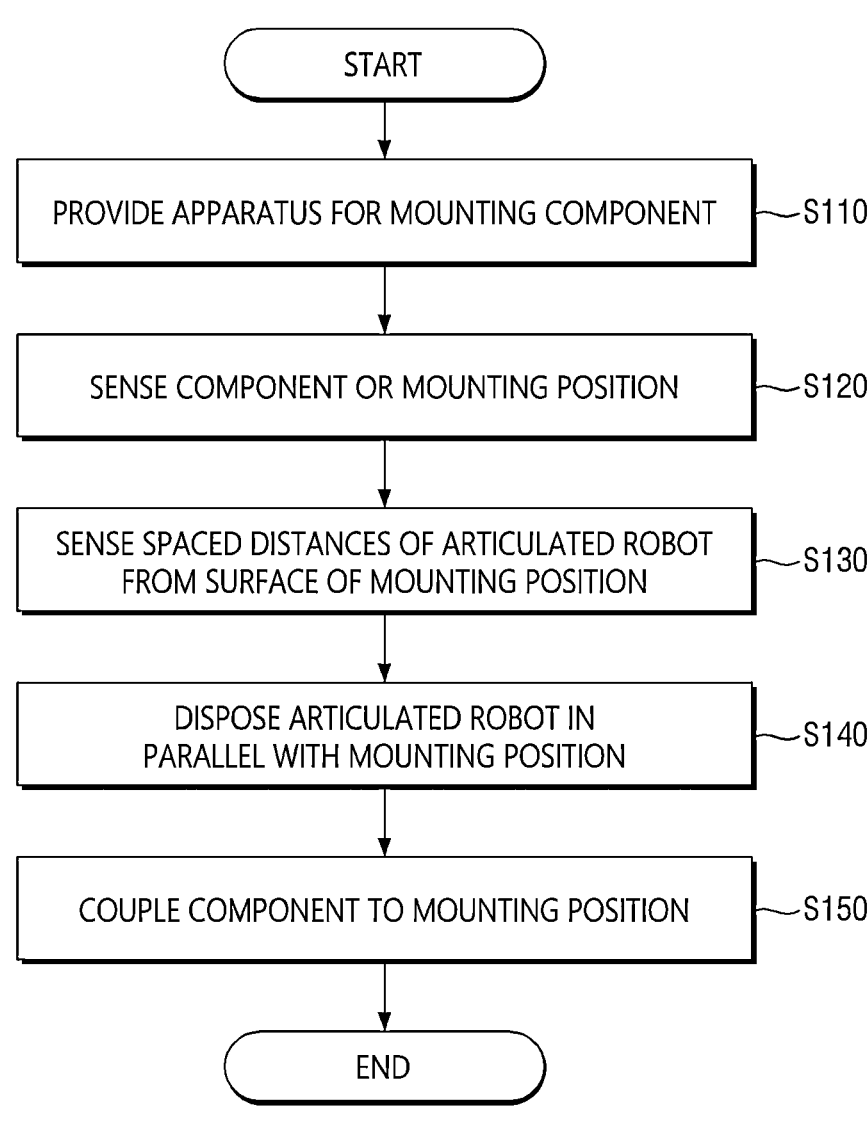

APPARATUS FOR MOUNTING COMPONENT AND METHOD FOR MOUNTING COMPONENT

CROSS-REFERENCE TO RELATED APPLICATION

This application claims priority from Korean Patent Application No. 10-2022-0064585 filed on May 26, 2022 in the Korean Intellectual Property Office, and all the benefits accruing therefrom under 35 U.S.C. 119, the contents of which in its entirety are herein incorporated by reference.

BACKGROUND

1. Technical Field

The present disclosure relates to an apparatus for mounting a component and a method for mounting a component.

2. Description of the Related Art

Semiconductor elements may be formed by repeatedly performing a series of manufacturing processes. The semiconductor elements may be individualized through a dicing process, and may be manufactured as semiconductor packages through a die bonding process and a packaging process.

In a manufacturing process for manufacturing the semiconductor elements, various types of process gas may be supplied. The process gas may be supplied to each process facility in a state in which it is stored in storage containers having a cylinder shape. Gas cylinders for storing the process gas may be stored and managed through a separate storage module.

SUMMARY

Meanwhile, automation for storage and management of gas cylinders is not sufficient, such that the storage and the management of the gas cylinders are performed manually by workers. Accordingly, the risk of a safety accident may occur during the movement of the gas cylinders, such that improvement for safety of the workers is required.

Aspects of the present disclosure provide an apparatus for mounting a component and a method for mounting a component capable of automating management of gas cylinders.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to an aspect of the present disclosure, an apparatus for mounting a component includes an articulated robot mounting a component on a replacement target where the component is provided at a mounting position, a first sensor unit provided in the articulated robot and sensing the mounting position or whether or not the component is provided, a second sensor unit provided in the articulated robot and sensing spaced distances between the articulated robot and the mounting position at a plurality of points, and a control unit controlling the articulated robot to mount the component on the replacement target and controlling a position of the articulated robot so that a difference between spaced distance values between the articulated robot and the plurality of points sensed by the second sensor unit converges to zero, when the component is not sensed or a surface of the mounting position is sensed by the first sensor unit.

According to another aspect of the present disclosure, a method for mounting a component includes providing an apparatus for mounting a component including a vision sensor capturing and processing an image, a distance sensor sensing a distance, and an articulated robot moving a component, sensing the component or a mounting position where the component is mounted, by the vision sensor, sensing spaced distances of the articulated robot from a surface of the mounting position by the distance sensor when the component is not sensed or the surface of the mounting position is sensed by the vision sensor, disposing the articulated robot in parallel with the mounting position so that a difference between spaced distance values between the articulated robot and a plurality of points positioned on the surface of the mounting position converges to zero, and coupling the component to the mounting position by a nut runner provided in the articulated robot.

Detailed contents of other exemplary embodiments are described in a detailed description and are illustrated in the drawings.

BRIEF DESCRIPTION OF THE DRAWINGS

The above and other aspects and features of the present disclosure will become more apparent by describing in detail exemplary embodiments thereof with reference to the attached drawings, in which:

FIG. 1 is a front view illustrating a storage module provided with an apparatus for mounting a component according to some exemplary embodiments of the present disclosure;

FIG. 2 is a plan view illustrating the storage module;

FIG. 3 is a perspective view illustrating a form in which the apparatus for mounting a component according to an exemplary embodiment of the present disclosure is installed on a rail;

FIG. 4 is a perspective view illustrating the apparatus for mounting a component according to an exemplary embodiment of the present disclosure and a cap;

FIG. 5 is a view illustrating an image in which a vision sensor of the apparatus for mounting a component according to an exemplary embodiment of the present disclosure senses a first edge;

FIG. 6 is a view illustrating an image in which the vision sensor of the apparatus for mounting a component according to an exemplary embodiment of the present disclosure senses a second edge;

FIG. 7 is a view illustrating an image in which the vision sensor of the apparatus for mounting a component according to an exemplary embodiment of the present disclosure senses a third edge;

FIG. 8 is a view illustrating an image in which the vision sensor of the apparatus for mounting a component according to an exemplary embodiment of the present disclosure senses a fourth edge;

FIG. 9 is a view for describing a first plane and vertices sensed by a distance sensor of the apparatus for mounting a component according to an exemplary embodiment of the present disclosure;

FIG. 10 is a front view illustrating a state in which the distance sensor of the apparatus for mounting a component according to an exemplary embodiment of the present disclosure senses spaced distances of a gas cylinder; and FIG. 11 is a flowchart illustrating a method for mounting a component according to some exemplary embodiments of the present disclosure.

DETAILED DESCRIPTION OF THE EMBODIMENTS

Hereinafter, exemplary embodiments of the present disclosure will be described in detail with reference to the accompanying drawings. Advantages and features of the present disclosure and methods for accomplishing these advantages and features will become apparent from exemplary embodiments to be described later in detail with reference to the accompanying drawings. However, the present disclosure is not limited to exemplary embodiments to be disclosed below, but may be implemented in various different forms, these exemplary embodiments will be provided only in order to make the present disclosure complete and allow one of ordinary skill in the art to which the present disclosure pertains to completely recognize the scope of the present disclosure, and the present disclosure will be defined by the scope of the claims. Throughout the specification, the same components will be denoted by the same reference numerals.

The terms as used herein are for describing exemplary embodiments rather than limiting the present disclosure. In the present specification, a singular form includes a plural form unless stated otherwise in the phrase. The terms "comprise" and/or "comprising" as used herein do not exclude the existence or addition of one or more other components, steps, operations, and/or elements in addition to the mentioned components, steps, operations, and/or elements.

FIGS. 1 and 2 are views for describing a storage module provided with an apparatus for mounting a component according to some exemplary embodiments of the present disclosure.

Referring to FIGS. 1 and 2, replacement targets 10 may have gas stored therein, and may be replaced when the gas is exhausted. Components 20 may be coupled to mounting positions 11 provided on the replacement targets 10 for safety.

For example, the replacement targets 10 may be gas cylinders 10A supplying gas to a substrate processing apparatus (not illustrated). The components 20 may be caps 20A mounted on the gas cylinders 10A. The mounting positions 11 may be positions of neck rings 11A of the gas cylinders 10A.

Hereinafter, it will be described by way of example that the replacement targets 10 are the gas cylinders 10A including bodies (not illustrated) in which gas is stored, the components are the caps 20A covering upper ends of the gas cylinders 10A, and the mounting positions 11 are the positions of the neck rings 11A (upper ends of the bodies) and are surfaces of the neck rings 11A. In addition, the neck ring 11A, which is the mounting position 11, may be provided with a valve 10V for discharging the gas in the gas cylinder 10A.

In addition, the gas cylinder 10A may further include a nut part 20N so that the cap 20A may be mounted by a nut runner 115 (see FIGS. 1 and 4). The nut part 20N may extend above the cap 20A. The nut part 20N may be fitted into a fitting part 115A of the nut runner 115 to be described later and rotate in conjunction with a rotational operation of the nut runner 115 to allow the cap 20A to be coupled to the neck ring 11A.

The nut part 20N may have a shape corresponding to a shape of the fitting part 115A so as to be stably coupled to the fitting part 115A. When the fitting part 115A has a hexagonal shape, the nut part 20N may have a hexagonal nut shape. However, shapes of the nut part 20N and the fitting part 115A are not limited to the hexagon shape, the nut part 20N may have a shape matching a shape of the fitting part 115A, and the fitting part 115A may have various shapes in which the nut part 20N does not run idle.

A plurality of gas cylinders 10A may be provided, and the same gas or different types of gas may be stored in the plurality of gas cylinders 10A. Sizes such as heights and widths of the plurality of gas cylinders 10A may be the same as or different from each other. That is, the gas cylinders 10A may have various shapes for supplying the gas to the substrate processing apparatus. However, sizes of the nut parts 20N fitted into the nut runner 115 may all be the same as each other so that one nut runner 115 may be generally used even though sizes of the bodies of the gas cylinders 10A or sizes of the caps 20A are different from each other.

In the plurality of gas cylinders 10A of which the sizes of the bodies are various, edges E1, E2, E3, and E4 (see FIGS. 5 to 8) of four points are image-processed by the apparatus 100 for mounting a component, the center points of the neck rings 11A may be sensed from the edges of the four points, and thus, it is possible to automatically couple the caps 20A to individual gas cylinders 10A.

That is, even though the plurality of gas cylinders 10A having different gas storage volumes are provided in the present exemplary embodiment, the caps 20A may be coupled to the individual gas cylinders 10A, respectively, by one apparatus 100 for mounting a component.

Hereinafter, storage of the gas cylinder 10A will be described.

The gas cylinders 10A may be installed in the storage module 30 such as a pallet or a storage box 30A. The storage module 30 may have a box shape, and according to a modified example of an exemplary embodiment, a door 31 may be provided in the storage module 30 to open and close the storage module 30. The storage module 30 may be provided adjacent to the substrate processing apparatus so that the gas cylinder 10A easily supplies the gas to the substrate processing apparatus.

The gas cylinder 10A may be carried into the storage module 30 so as to supply the gas to the substrate processing apparatus. For example, the gas cylinder 10A may be carried into the storage module 30 by a transfer robot 50 (see FIG. 2) moving the replacement target 10, and the cap 20A may be separated from the gas cylinder 10A by the apparatus 100 for mounting a component so that the valve 10V may be exposed when the component 20 is sensed by a first sensor unit 120.

The gas cylinder 10A may be replaced when the gas is exhausted. However, the cap 20A may be coupled to the gas cylinder 10A so that a work environment does not become dangerous by a residual gas in the gas cylinder 10A. That is, prior to carrying-out of the gas cylinder 10A, when the component 20 is not sensed by the first sensor unit 120 (when the neck ring 11A, which is a surface of the mounting position 11, is sensed), the cap 20A may be coupled to the gas cylinder 10A by the apparatus 100 for mounting a component so as to cover the valve 10V. After the cap 20A is coupled to the gas cylinder 10A, the transfer robot 50 may carry out the gas cylinder 10A from the storage module 30.

In the present exemplary embodiment, the transfer robot 50 may be provided as a bogie, and it has been illustrated in FIG. 2 that the transfer robot 50 is provided outside the storage module 30. However, the gas cylinder 10A may be carried out to the outside of the storage module 30 by a separate transfer module provided in the storage module 30 in addition to the transfer robot 50 such as the bogie.

In addition, the storage module 30 may be provided with grippers 41 gripping circumferences of the gas cylinders 10A and gripper driving units 43 driving the grippers 41, but this is only an example, the grippers 41 and the gripper driving units 43 may be omitted, and a configuration may be variously changed.

In addition, the storage module 30 may be provided with a rail 30R guiding the movement of an articulated robot 110 to be described later (see FIGS. 1 and 3). The rail 30R may extend in a horizontal direction so as to face each of the plurality of gas cylinders 10A provided in a row on a floor surface.

It has been illustrated in FIG. 1 that the rail 30R is provided on the ceiling of the storage module 30. However, the rail 30R is not limited thereto, and may be provided in various structures and positions where it may guide the movement of the articulated robot 110. For example, the rail 30R may be provided on a circumferential surface of the storage module 30 or may be provided on a wall surface facing the door 31.

It has been described in the present exemplary embodiment that one articulated robot 110 is provided and the caps 20A are mounted on the plurality of gas cylinders 10A, respectively, but the present disclosure is not limited thereto, and other modified examples are possible.

For example, a plurality of articulated robots 110 may be provided, and the number of articulated robots 110 may be the same as the number of gas cylinders 10A. For example, N (natural number) articulated robots 110 may be provided in the storage module 30 in which N gas cylinders 10A are stored. In this case, since the articulated robots 110 have only to move to correspond to individual gas cylinders 10A, the articulated robots 110 do not move along the rail 30R in the horizontal direction, and may also have a structure in which they move along a length direction of the gas cylinders 10A.

Hereinafter, the apparatus 100 for mounting a component that mounts the caps 20A on the gas cylinders 10A will be described with reference to the drawings.

FIGS. 3 and 4 are views for describing the apparatus for mounting a component according to an exemplary embodiment of the present disclosure. FIGS. 5 to 8 are views illustrating an image in which a vision sensor of the apparatus for mounting a component according to an exemplary embodiment of the present disclosure senses edges of four points. FIG. 9 is a view for describing a first plane and vertices sensed by a distance sensor of the apparatus for mounting a component according to an exemplary embodiment of the present disclosure. In addition, FIG. 10 is a front view illustrating a state in which the distance sensor of the apparatus for mounting a component according to an exemplary embodiment of the present disclosure senses spaced distances of a gas cylinder.

Referring to FIGS. 3 to 10, the apparatus 100 for mounting a component according to the exemplary embodiment of the present disclosure is an apparatus that mounts the components 20 on the replacement targets 10 or separates the components 20 from the replacement targets 10, and may include an articulated robot 110, a first sensor unit 120, a second sensor unit 130, and a control unit 140.

Briefly, the apparatus 100 for mounting a component may sense a position of the replacement target 10 and whether or not the component 20 is provided using the first sensor unit

120. In addition, the apparatus 100 for mounting a component may sense an inclination of the neck ring 11A, which is a mounting position at which the component 20 is mounted, using the second sensor unit 130. In addition, the apparatus 100 for mounting a component may control the articulated robot 110 to have the same inclination as the inclination of the neck ring 11A, accurately position the component 20 at the mounting position 11 of the replacement target 10, and then couple the component 20 to the mounting position 11 of the replacement target 10.

First, referring to FIGS. 3 and 4, the articulated robot 110 may couple or decouple the replacement target 10 and the component 20 to or from each other. That is, the articulated robot 110 may mount the component 20 on the mounting position 11 of the replacement target 10 or separate the component 20 from the mounting position 11 of the replacement target 10, under the control of the control unit 140.

The articulated robot 110 may include a robot arm 111. The robot arm 111 may be configured to be movable toward the replacement target 10. As an example, the robot arm 111 may have a structure capable of rotation, extension/contraction, or both rotation and extension. The articulated robot 110 may include a driving unit for each of an X-axis, a Y-axis, and a Z-axis so as to move and rotate in each of an X-axis direction, a Y-axis direction, and a Z-axis direction for an operation of the robot arm 111. The driving unit may include a motor, a timing belt, a pulley, and the like, but is not limited thereto.

Although not illustrated in the drawings, the articulated robot 110 may further include a separate gripper for gripping both side surfaces of the component 20 in addition to the robot arm 111. The gripper provided in the articulated robot 110 may be provided more adjacent to the nut runner 115 than the robot arm 111, and may be provided in a form in which it is disposed on both sides of the component 20 at a circumference of the nut runner 115 so as to assist the nut runner 115 to grip the component 20.

In addition, the articulated robot 110 may include the nut runner 115 installing the component 20. The nut runner 115 may be configured to axially rotate the component 20, and may use electric power or compressed air. For example, the nut runner 115 may be provided with the fitting part 115A into which the component 20 is fitted while being axially rotated (see FIG. 4).

The nut part 20N may be fitted into the fitting part 115A, as described above, and a fitting groove (not illustrated) having the same shape (that may be a hexagonal shape) as the nut part 20N may be formed in the fitting part 115A.

One articulated robot 110 may mount the components 20 on the plurality of gas cylinders 10A. To this end, the articulated robot 110 may move to positions of a plurality of replacement targets 10 along the rail 30R guiding the movement of the articulated robot 110.

The first sensor unit 120 may be provided in the articulated robot 110 and may be provided as a vision sensor 120A.

The first sensor unit 120 may sense whether or not the replacement target 10 includes the component 20 (or whether or not the neck ring 11A, which is the mounting position 11, is exposed) using the vision sensor 120A. For example, image data of the component 20, the mounting position 11 (which may be the neck ring 11A), and the like, may be previously provided to the vision sensor 120A or the control unit 140. According to whether or not an image captured by the vision sensor 120A matches the previously provided image data of the component 20, the neck ring 11A, which is the mounting position 11, and the like, the first sensor unit 120 may sense a target (e.g., a component) with which the image coincides.

In addition, the first sensor unit 120 may image-process the edges E1, E2, E3, and E4 of the four points spaced apart from each other at equal intervals in the neck ring 11A to sense the center point of the neck ring 11A from edges of three or more points of the edges E1, E2, E3, and E4 of the four points.

For example, referring to FIGS. 5 to 9, the first sensor unit 120 may sense virtual tangent lines in contact with an arc of the neck ring 11A among a plurality of virtual straight lines, and determine contact points between the arc and the tangent lines as the edges E1, E2, E3, and E4. In addition, the four points are tangential positions at the top, bottom, left, and right in FIG. 5 as an example, and may be the top, bottom, left, and right edges of the neck ring 11A.

In addition, when the first sensor unit 120 senses the center point of the neck ring 11A from the edges of the three points or more, the first sensor unit 120 may sense the center point of the neck ring 11A by connecting the edges of the three or more points to each other with a virtual arc and calculating a radius on the basis of the virtual arc. The center point of the neck ring 11A sensed and obtained by the first sensor unit 120 may be used as the center point of a first plane 11B (see FIG. 9), which is a sensing reference of the second sensor unit 130.

In addition, the reason why the first sensor unit 120 does not image-process the edges of the three points and image-processes the edges E1, E2, E3, and E4 of the four points is that any one of the edges E1, E2, E3, and E4 of the four points may be set as first noise data to be described later. This will be described later in a description of the control unit 140.

The second sensor unit 130 may be provided in the articulated robot 110 and may be provided as a distance sensor 130A.

The second sensor unit 130 may sense spaced distances between the articulated robot 110 and the mounting position 11 at a plurality of points. The second sensor unit 130 may sense spaced distances between vertices V1, V2, V3, and V4 of a first plane 11B provided by the control unit 140 and the articulated robot 110.

In other words, the vertexes V1, V2, V3, and V4 of the first plane 11B are provided as a plurality of points, such that the second sensor unit 130 may sense the spaced distances of the articulated robot 110 on the basis of the first plane 11B.

The second sensor unit 130 senses the spaced distances of the articulated robot 110 at the plurality of points in order to sense/determine inclination of the neck ring 11A, which is the mounting position 11, with respect to a floor surface or the articulated robot 110.

Referring to FIG. 10, the gas cylinder 10A having neck ring 11A provided thereon may be stored in a state in which it is not parallel to the bottom surface and is inclined with respect to the floor surface due to misplacement by the transfer robot 50, interference of other components, or the like.

In this case, when the second sensor unit 130 senses the spaced distances of the articulated robot 110 at positions of the vertices V1, V2, V3, and V4 of the first plane 11B, values (spaced distances) sensed at a plurality of vertices V1, V2, V3, and V4 may be different from each other depending on a degree of inclination.

In addition, since the valve 10V protrudes from the first flat surface 11B, when the valve 10V is positioned at any one of the plurality of vertices V1, V2, V3, and V4 of the first flat surface 11B, a position of the valve 10V may be set as second noise data to be described later.

Inclination sensing by the second sensor unit 130 and the second noise data will be described later.

The control unit 140 may control a position of the nut runner so that a rotary shaft of the nut runner 115 coincides with the center point of the neck ring 11A sensed by the first sensor unit 120 and the neck ring 11A and the nut runner 115 are parallel to each other.

The control unit 140 may control the articulated robot 110 to mount the component 20 on the replacement target 10 and may control a position of the articulated robot 110 so that a difference between spaced distance values between the articulated robot 110 and the plurality of points sensed by the second sensor unit 130 converges to zero, when the component 20 is not sensed by the first sensor unit 120 (or when a shape of the neck ring 11A, which is the mounting position, is sensed).

The control unit 140 may provide a polygon formed by virtually connecting a plurality of vertices V1, V2, V3, and V4 to each other inside a rim of the neck ring 11A on the basis of the center point of the neck ring 11A sensed by the vision sensor 120A as the first plane 11B. The first plane 11B may be provided as a reference for sensing the spaced distances by the second sensor unit 130.

For example, four vertices V1, V2, V3, and V4 of the first plane 11B may be vertices V1, V2, V3, and V4 with which the arc of the neck ring 11A is in contact inside the rim of the neck ring 11A on the basis of the center point of the neck ring 11A sensed by the vision sensor 120A. However, this is an example, and thus, the present disclosure is not limited thereto. As another example, the vertices V1, V2, V3, and V4 are formed at points spaced apart from the center point of the neck ring 11A at equal intervals so that the first plane 11B has a shape such as a rectangular shape or a rhombic shape having four sides with the same length, such that the vertices V1, V2, V3, and V4 may be provided in a smaller radius than the arc of the neck ring 11A. In other words, the vertices V1, V2, V3, and V4 are provided as the first plane 11B, shapes and sizes of the vertices V1, V2, V3, and V4 are not limited, and various modified examples are possible so that the plurality of vertices V1, V2, V3, and V4 are provided on the same basis.

The first plane 11B provided by the control unit 140 may have a square shape or a rhombic shape formed by virtually connecting the four vertexes V1, V2, V3, and V4 to each other. Alternatively, the first plane 11B provided by the control unit 140 may have a right triangular shape (which may be a shape in which one vertex is excluded from the previously set square shape) formed by virtually connecting three vertices to each other. The four vertices V1, V2, V3, and V4 of the first plane 11B may include a first vertex V1, a second vertex V2, a third vertex V3, and a fourth vertex V4.

The control unit 140 may provide a vertex having a minimum spaced distance value among the four vertices V1, V2, V3, and V4 sensed by the second sensor unit 130 as the fourth vertex V4, and provide the first plane 11B having the right triangular shape by virtually connecting the first vertex V1, the second vertex V2, and the third vertex V3 excluding the fourth vertex V4 to each other.

For example, when the valve 10V is provided on the mounting position 11 of the replacement target 10, the control unit 140 may provide the first noise data and the second noise data as data sensed at a position of the valve 10V. However, even though the valve 10V is not provided at the fourth vertex V4, since information of the first plane 11B may be obtained with data on the three vertices, the fourth vertex V4 is always noise data and may be excluded from reference points sensed by the second sensor unit 130, but the present disclosure is not limited thereto.

Specifically, the control unit 140 may set one of the edges E1, E2, E3, and E4 of the four points sensed by the first sensor unit 120 as the first noise data.

The first noise data is discarded data, and may be composed of a value deviating from a radius from the center point sensed from the edges E1, E2, E3, and E4 of the four points sensed by the first sensor unit 120. This is to provide a value different from a radius of the neck ring 11A because the valve 10V deviates from the radius of the neck ring 11A as noise data.

In addition, the control unit 140 may set one of data sensed at the four vertices V1, V2, V3, and V4 sensed by the second sensor unit 130 as the second noise data. Here, the second noise data is discarded data, may be a point where the valve 10V is positioned, and may be a value sensed at the fourth vertex.

In other words, the valve 10V is provided at a position higher than a surface of the neck ring 11A, such that a value of a spaced distance between the position of the valve 10V and the articulated robot 110/second sensor unit 130 may be smaller than a spaced distance between the surface of the neck ring 11A and the articulated robot 110/second sensor unit 130. Accordingly, the fourth vertex having the minimum spaced distance value may be set as the second noise data and be excluded from data for controlling the articulated robot 110.

The control unit 140 may utilize data from which the second noise data is excluded, that is, data sensed at the first vertex V1, the second vertex V2, and the third vertex V3. The control unit 140 may determine that the neck ring 11A is inclined when a height of at least one of the first vertex V1, the second vertex V2, and the third vertex V3 is different from a height of the others of the first vertex V1, the second vertex V2, and the third vertex V3.

For example, the vertices V1, V2, V3, and V4 may be set as 3-dimensional coordinates (X, Y, Z). In addition, when coordinates of the first vertex V1 are (0, 0, 0) and the coordinates of the second and third vertices V2 and V3 are also (0, 0, 0) on the basis of the first vertex V1, the control unit 140 may determine that there is no inclination in the neck ring 11A.

On the other hand, when coordinates of the second vertex V2 have values of (x, y, z) and coordinates of the third vertex V3 have values of (x', y', z'), the control unit 140 may determine that height changes occur by changed values, respectively, such that inclination occurs in the neck ring 11A.

When it is determined that the inclination occurs, the control unit 140 may control an inclination of the articulated robot 110 so that the difference between the spaced distance values between the articulated robot 110 and the plurality of points sensed by the second sensor unit 130 converges to zero. The control unit 140 may control the inclination of the articulated robot 110 so that an inclination of the second vertex V2 based on the first vertex V1 on the first plane 11B and an inclination of the third vertex V3 based on the first vertex V1 on the first plane 11B are zero.

For example, the control unit 140 may control the inclination of the articulated robot 110 so that the inclination of the articulated robot 110 is zero by pitching and rolling operations of X and Y axes of the articulated robot 110. The control unit 140 may control the inclination of the articulated robot 110 so that the inclination of the articulated robot 110 is zero by calculating lengths of a hypotenuse and adjoint sides of a triangle from the values of (x, y, z) of the second vertex V2 (see FIG. 9) and the values of (x', y', z') of the third vertex V3 (see FIG. 9) described above and calculating angles for pitching and rolling of the articulated robot 110 using the calculated length values and a trigonometric function.

It has been described in the present exemplary embodiment that when the cap 20A is mounted on the gas cylinder 10A, if inclinations of the gas cylinder 10A and the cap 20A are different from each other, it is difficult to install the cap 20A, and thus, the cap 20A is installed by controlling the articulated robot 110 under the control of the control unit 140 described above.

On the other hand, when the gas cylinder 10A, which is the replacement target 10, is carried into the pallet or the storage box 30A by the transfer robot 50 moving the replacement target 10 and the component 20 is sensed by the vision sensor 120A, which is the first sensor unit 120, the articulated robot 110 may grip and separate the cap 20A, which is the component 20, without sensing an inclination.

This is because it is sufficient if the articulated robot 110 grips the cap 20A when the cap 20A is separated from the gas cylinder 10A, and thus, the articulated robot 110 may separate the cap 20A without sensing inclination of the gas cylinder 10A.

In other words, when the cap 20A is mounted on the gas cylinder 10A, the cap 20A needs to be controlled so as not to be inclined for safe closing. This is because the cap 20A is not properly mounted on the neck ring 20A in an inclined state, and thus, sealing may not be achieved. On the other hand, when the cap 20A is separated from the gas cylinder 10A, it is sufficient if the articulated robot 110 grips and rotates the cap 20A because the central axis of the cap 20A is already aligned with the neck ring 20A, and thus, the inclination of the neck ring 20A does not need to be separately sensed.

Hereinafter, a method for mounting a component using the apparatus 100 for mounting a component that mounts the component 20 on the gas cylinder 10A described above will be described with reference to FIG. 11, and an overlapping description of the same components performing the same functions will be omitted.

FIG. 11 is a flowchart illustrating a method for mounting a component according to some exemplary embodiments of the present disclosure.

Referring to FIG. 11, the method for mounting a component may include a step (S110) of providing the apparatus 100 for mounting a component including the vision sensor 120A capturing and processing an image, the distance sensor 130A sensing a distance, and the articulated robot 110 moving the component, a step (S120) of sensing the component 20 or the mounting position 11 by the vision sensor 120A, a step (S130) of sensing the spaced distances of the articulated robot 110 from the surface of the mounting position by the distance sensor 130A when the component 20 is not sensed or the surface of the mounting position 11 is sensed by the vision sensor 120A, a step (S140) of disposing the articulated robot 110 in parallel with the mounting position 11 so that a difference between spaced distance values between the articulated robot 110 and a plurality of points positioned on the surface of the mounting position 11 converges to zero, and a step (S150) of coupling the component 20 to the mounting position 11 by the nut runner 115 provided in the articulated robot 110.

Specifically, the step (S110) of providing the apparatus 100 for mounting a component may be performed.

In the step (S110) of providing the apparatus 100 for mounting a component, the apparatus 100 for mounting a component including the vision sensor 120A capturing and processing the image, the distance sensor 130A sensing the distance, and the articulated robot 110 moving the component 20 is provided. Here, the apparatus 100 for mounting a component is the same as that described with reference to FIGS. 3 and 4, and an overlapping description thereof will thus be omitted.

Next, the step (S120) of sensing the component 20 or the mounting position 11 by the vision sensor 120A may be performed. This is to mount the component 20 on the replacement target 10 before carrying out the replacement target 10 when the component 20 is not provided on the replacement target 10.

For example, the vision sensor 120A may sense the replacement target 10 at a position facing the mounting position 11 and sense that the component 20 is mounted on the replacement target 10 when an image of the component 20 is sensed.

On the other hand, the vision sensor 120A may sense (determine) that the component 20 is not mounted on the replacement target 10 when the image of the component 20 is not sensed or the surface (neck ring 20A) of the mounting position is sensed.

In addition, the vision sensor 120A may sense not only the component 20 or the mounting position 11 but also the center point of the mounting position 11. Accordingly, the vision sensor 120A may perform a step (S123) of sensing the center point of the mounting position 11 when the neck ring 20A, which is the surface of the mounting position, is sensed.

For example, the vision sensor 120A may image-process the edges E1, E2, E3, and E4 of the four points spaced apart from each other at equal intervals at the mounting position 11 to sense the center point of the mounting position 11 from edges of three or more points of the edges E1, E2, E3, and E4 of the four points.

In addition, one of data sensed at the edges E1, E2, E3, and E4 of the four points sensed by the first sensor unit 120 may be set as the first noise data. When the first noise data is set, a value deviating from a radius from the center point sensed from the edges E1, E2, E3, and E4 of the four points sensed by the first sensor unit 120 may be set as the first noise data.

However, a description of the sensing of the center point of the mounting position 11, vertices of a first plane 11B to be described later, and the like, overlaps a description of the apparatus 100 for mounting a component, and will thus be omitted.

Next, a step (S125) of providing a polygon formed by vertically connecting a plurality of vertices to each other inside the rim of the mounting position 11 on the basis of the center point of the mounting position 11 sensed by the vision sensor 120A as the first plane 11B may be performed.

Next, the step (S130) of sensing the spaced distances of the articulated robot 110 may be performed.

When the component is not sensed or the surface of the mounting position 11 is sensed by the vision sensor 120A, the distance sensor 130A may sense the spaced distances of the articulated robot 110 from the first plane 11B, which is the surface of the mounting position 11. That is, the second sensor unit 130 may sense the spaced distances of the articulated robot 110 on the basis of the first plane 11B.

Next, the step (S140) of disposing the articulated robot 110 in parallel with the mounting position 11 may be performed.

For example, the articulated robot 110 may be disposed in parallel with the mounting position 11 so that the difference between the spaced distance values between the articulated robot 110 and the plurality of points (which may be the vertices V1, V2, V3, and V4) positioned on the first plane 11B, which is the surface of the mounting position 11, converges to zero.

In other words, the articulated robot 110 may be disposed so that a spaced distance between the first vertex V1 and the articulated robot 110 is the same as spaced distances between the other vertices (which may be the second vertex V2 and the third vertex V3) and the articulated robot 110.

In addition, a vertex having the minimum spaced distance value among the four vertices V1, V2, V3, and V4 of the first plane 11B may be provided as the second noise data so as to exclude data of the position of the valve 10V from the four vertices V1, V2, V3, and V4 of the first plane 11B (see FIG. 10).

Accordingly, the spaced distances of the articulated robot 110 may be sensed at positions of the first vertex V1, the second vertex V2, and the third vertex V3 excluding the second noise data.

In addition, when the articulated robot 110 is disposed in parallel with the mounting position 11, the rotary shaft of the nut runner 115 may be made to coincide with the center point of the mounting position 11 by the control unit 140. A process of making the rotary shaft of the nut runner 115 coincide with the center point of the mounting position 11 may be performed before a process of disposing the articulated robot 110 in parallel with the mounting position 11, but is not limited thereto, and but is not limited thereto and may be performed as a process of disposing the articulated robot 110 in parallel with the mounting position 11. That is, the order of the process of making the rotary shaft of the nut runner 115 coincide with the center point of the mounting position 11 and the process of disposing the articulated robot 110 in parallel with the mounting position 11 is not limited.

Next, the step (S150) of coupling the component 20 to the mounting position 11 by the nut runner 115 provided in the articulated robot 110 may be performed.

In addition, the articulated robot 110 may include the nut runner 115 installing the component 20. The nut runner 115 may couple the component 20 to the replacement target 10 by axially rotating the component 20 using electric power or compressed air.

After the component 20 is coupled to the replacement target 10, the replacement target 10 may be carried out from the pallet or the storage box 30A.

The exemplary embodiments of the present disclosure have been described hereinabove with reference to the accompanying drawings, but it will be understood by one of ordinary skill in the art to which the present disclosure pertains that various modifications and alterations may be made without departing from the technical spirit or essential feature of the present disclosure. Therefore, it is to be understood that the exemplary embodiments described above are illustrative rather than being restrictive in all aspects.

What is claimed is:

1. An apparatus for mounting a component, comprising:
an articulated robot mounting a component on a replacement target where the component is provided at a mounting position;

a first sensor unit provided in the articulated robot and sensing the mounting position or whether or not the component is provided;

a second sensor unit provided in the articulated robot and sensing spaced distances between the articulated robot and the mounting position at a plurality of points; and a control unit controlling the articulated robot to mount the component on the replacement target and controlling a position of the articulated robot so that a difference between spaced distance values between the articulated robot and the plurality of points sensed by the second sensor unit converges to zero, when the component is not sensed or a surface of the mounting position is sensed by the first sensor unit.

2. The apparatus for mounting a component of claim 1, wherein the articulated robot moves to positions of one or more replacement targets along a rail guiding movement of the articulated robot.

3. The apparatus for mounting a component of claim 1, wherein the articulated robot mounts the component on the mounting position of the replacement target or separates the component from the mounting position of the replacement target, under the control of the control unit.

4. The apparatus for mounting a component of claim 3, wherein when the replacement target is carried into a pallet or a storage box by a transfer robot moving the replacement target and the component is sensed by the first sensor unit, the articulated robot separates the component from the replacement target.

5. The apparatus for mounting a component of claim 1, wherein the replacement target is a gas cylinder supplying gas to a substrate processing apparatus, the component includes a cap mounted on the gas cylinder, and the mounting position is provided as a position of a neck ring of the gas cylinder.

6. The apparatus for mounting a component of claim 5, wherein the first sensor unit is provided as a vision sensor, and the first sensor unit image-processes edges of four points spaced apart from each other at equal intervals at the neck ring to sense a center point of the neck ring from edges of three or more points of the edges of the four points.

7. The apparatus for mounting a component of claim 6, wherein the control unit provides a polygon formed by virtually connecting a plurality of vertices to each other inside a rim of the neck ring on the basis of the center point of the neck ring sensed by the vision sensor as a first plane that is a sensing reference of the second sensor unit, and the second sensor unit is provided as a distance sensor and senses spaced distances between the vertices of the first plane provided by the control unit and the articulated robot.

8. The apparatus for mounting a component of claim 7, wherein the control unit provides the first plane having a square shape or a rhombic shape formed by virtually connecting four vertices to each other or provides the first plane having a right triangular shape formed by virtually connecting three vertices to each other.

9. The apparatus for mounting a component of claim 8, wherein the four vertices include a first vertex, a second vertex, a third vertex, and a fourth vertex, and the control unit provides a vertex having a minimum spaced distance value among the four vertices sensed by the second sensor unit as the fourth vertex, and provides the first plane having the right triangular shape by virtually connecting the first vertex, the second vertex, and the third vertex excluding the fourth vertex to each other.

10. The apparatus for mounting a component of claim 9, wherein the control unit sets one of data sensed at the edges of the four points sensed by the first sensor unit as first noise data, and sets data of the fourth vertex sensed by the second sensor unit as second noise data.

11. The apparatus for mounting a component of claim 10, wherein the replacement target includes a valve provided on the mounting position, and at least one of the first noise data and the second noise data constitutes data sensed at a position of the valve.

12. The apparatus for mounting a component of claim 11, wherein the first noise data is composed of a value deviating from a radius from the center point sensed from the edges of the four points sensed by the first sensor unit.

13. The apparatus for mounting a component of claim 9, wherein the control unit determines that the neck ring is inclined when a height of at least one of the first vertex, the second vertex, and the third vertex is different from a height of the others of the first vertex, the second vertex, and the third vertex.

14. The apparatus for mounting a component of claim 13, wherein the control unit controls an inclination of the articulated robot so that the difference between the spaced distance values between the articulated robot and the plurality of points sensed by the second sensor unit converges to zero, and controls the inclination of the articulated robot so that an inclination of the second vertex based on the first vertex on the first plane and an inclination of the third vertex V3 based on the first vertex on the first plane are zero.

15. The apparatus for mounting a component of claim 14, wherein the articulated robot includes a nut runner installing the component, and the control unit controls a position of the nut runner so that a rotary shaft of the nut runner coincides with the center point of the neck ring sensed by the first sensor unit and the neck ring and the nut runner are parallel to each other.

16. A method for mounting a component, comprising:

providing an apparatus for mounting a component including a vision sensor capturing and processing an image, a distance sensor sensing a distance, and an articulated robot moving a component;

sensing the component or a mounting position where the component is mounted, by the vision sensor;

sensing spaced distances of the articulated robot from a surface of the mounting position by the distance sensor when the component is not sensed or the surface of the mounting position is sensed by the vision sensor;

disposing the articulated robot in parallel with the mounting position so that a difference between spaced distance values between the articulated robot and a plurality of points positioned on the surface of the mounting position converges to zero; and coupling the component to the mounting position by a nut runner provided in the articulated robot.

17. The method for mounting a component of claim 16, further comprising, after the sensing of the component or the mounting position, image-processing edges of four points spaced apart from each other at equal intervals at the mounting position to sense a center point of the mounting position from edges of three or more points of the edges of the four points, by the vision sensor; and providing a polygon formed by vertically connecting a plurality of vertices to each other inside a rim of the mounting position on the basis of the center point of the mounting position sensed by the vision sensor as a first plane, and wherein in the sensing of the spaced distances of the articulated robot, the distance sensor senses the spaced distances of the articulated robot on the basis of the first plane.

18. The method for mounting a component of claim 17, wherein the disposing of the articulated robot in parallel with the mounting position includes making a rotary shaft of the nut runner coincide with the center point of the mounting position.

19. The method for mounting a component of claim 17, wherein a valve is provided at the mounting position, the first plane has a square shape or a rhombic shape having four sides having the same length,

the sensing of the spaced distances of the articulated robot includes providing data of a fourth vertex as second noise data while providing a vertex having a minimum spaced distance value among four vertices of the first plane as the fourth vertex so as to exclude data of a position of the valve from the four vertices of the first plane, and the spaced distances of the articulated robot are sensed at positions of a first vertex, a second vertex, and a third vertex excluding the second noise data.

20. The method for mounting a component of claim 19, before the sensing of the spaced distances of the articulated robot, further comprising setting one of the data sensed at the edges of the four points sensed by the vision sensor as first noise data, wherein in the setting of the first noise data, a value deviating from a radius from the center point sensed from the edges of the four points sensed by the vision sensor is set as the first noise data.

* * * * *